(12) United States Patent
Atluri et al.

(10) Patent No.: US 11,652,346 B2
(45) Date of Patent: May 16, 2023

(54) SYSTEMS AND METHODS FOR INPUT OVERCURRENT PROTECTION

(71) Applicant: HEWLETT PACKARD ENTERPRISE DEVELOPMENT LP, Houston, TX (US)

(72) Inventors: Rama Prasad Atluri, Houston, TX (US); Stewart Gavin Goodson, II, Houston, TX (US); Mark A Lawrence, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/703,090

(22) Filed: Mar. 24, 2022

(65) Prior Publication Data
US 2022/0216685 A1 Jul. 7, 2022

Related U.S. Application Data

(63) Continuation of application No. 16/191,362, filed on Nov. 14, 2018, now Pat. No. 11,316,336.

(51) Int. Cl.
*H02H 3/093* (2006.01)
*H02H 3/06* (2006.01)

(52) U.S. Cl.
CPC .......... *H02H 3/093* (2013.01); *H02H 3/066* (2013.01)

(58) Field of Classification Search
CPC .......... H02H 3/027; H02H 3/08; H02H 3/093; H02H 3/0935; H02H 3/247; H02H 3/26; H02H 3/38; H02H 9/004; H02H 9/02
See application file for complete search history.

(56) References Cited

U.S. PATENT DOCUMENTS

| 4,761,702 | A  | 8/1988  | Pinard |
| 7,489,491 | B2 | 2/2009  | Balakrishnan |
| 7,492,560 | B2 | 2/2009  | Hussein et al. |
| 7,685,447 | B2 | 3/2010  | Parker |
| 8,599,523 | B1 | 12/2013 | Ostrovsky et al. |

(Continued)

OTHER PUBLICATIONS

Semiconductor Components Industries, LLC, "ASM1832: 3.3 V P Power Supply Monitor and Reset Circuit," Aug. 2011, pp. 1-9, Rev. 3.

*Primary Examiner* — Nguyen Tran
(74) *Attorney, Agent, or Firm* — Sheppard Mullin Richter & Hampton LLP

(57) ABSTRACT

A system and method of protecting the input components of a power supply. An input overcurrent protection module is provided, which may be implemented in firmware, which monitors the input current through an input interface of the power supply. When the input current exceeds a threshold current (i.e., a current above the maximum rating of an input component, such as an input cable), the input current protection module determines whether an input overcurrent event is occurring. When it is determined that an input overcurrent event has occurred, the input current protection module disables the output circuitry of the power supply and triggers a few timers. The input overcurrent protection module continues to monitor the input and, if the input current continues to exceed the threshold current, is configured to shut down the power supply. In this way, input components may be protected from overcurrent issues in high-power systems.

19 Claims, 4 Drawing Sheets

(56) References Cited

U.S. PATENT DOCUMENTS

| | | | |
|---|---|---|---|
| 2008/0204949 A1* | 8/2008 | Zhou | H02H 1/0015 361/42 |
| 2008/0204955 A1* | 8/2008 | Parker | H02H 1/0015 361/87 |
| 2011/0063768 A1 | 3/2011 | Sexton et al. | |
| 2011/0216453 A1 | 9/2011 | Haines et al. | |
| 2014/0285927 A1* | 9/2014 | Leung | H02H 3/16 361/42 |
| 2015/0015999 A1 | 1/2015 | Relyea et al. | |
| 2016/0204711 A1 | 7/2016 | Morrow et al. | |

* cited by examiner

SYSTEMS AND METHODS FOR INPUT OVERCURRENT PROTECTION

DESCRIPTION OF RELATED ART

Power supplies primarily convert electric power from a power source into the correct voltage, current, and frequency required for one or more electrical loads. Accordingly, all power supplies include a power input connector (to receive electric current from a power source) and a power output connector (to distribute the converted power to loads). Power supplies and their components are generally rated by rating agencies for various electrical parameters, identifying the maximum amount of each parameter the component is capable of handling without degrading or failing.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1A:
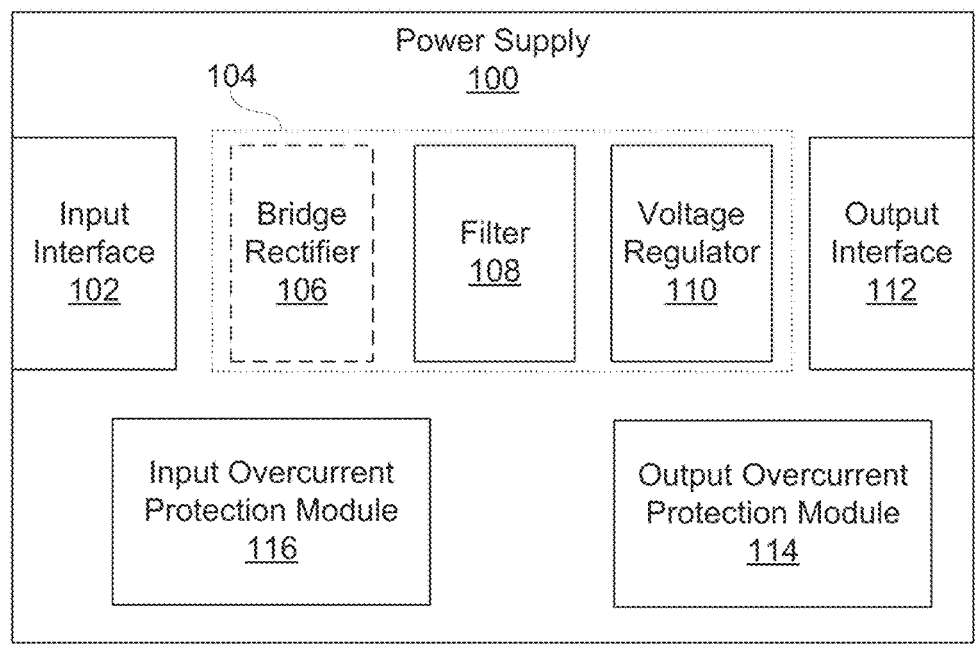
FIG. 1A illustrates an example power supply with input overcurrent protection in accordance with embodiments of the technology disclosed herein.

The figures are not exhaustive and do not limit the present disclosure to the precise form disclosed.

DETAILED DESCRIPTION

Traditionally, power supplies used to power a system include some form of output overcurrent protection. This protection seeks to protect the system components from damage due to conditions such as, for example, a short circuit within the system. One or more components within the power supply may be included to monitor the current being drawn by the various system components (i.e., loads) during operation. If that current exceeds a certain amount (possibly indicating a short circuit or other issue), the overcurrent protection components can trigger a shut down of the power supply to attempt to protect the system from major damage.

As processing speeds and complexity increase, servers are increasingly drawing more and more power. Accordingly, the operational demands on power supplies has also increased. Because voltage within the system generally needs to remain constant, the accepted current range for high-power application power supplies can approach (and exceed) the current rating of the standard input line cord and input interface of the power supplies, Traditionally, it was the power supply's ability to generate the required power for the system that served as the limiting factor, but in these high-power situations it can be the input side of the power supply that is the limiting factor.

As the input side of the power supply is isolated from the system, output overcurrent protection fails to protect the input side components of the power supply. In high-power scenarios, the current being drawn by the system may be within the system's normal operating range, but it could exceed the worst-case rating of the input components of the power supply. This compromises the reliability of the power supply, raises the potential for thermal damage to the input components, and result in violations of regulatory requirements that all components are operating at less than or equal to 100% of their electrical component ratings. One solution would be to use higher rated input components. However, this would require a deviation from the standard input cable used with power supplies, necessitating power supplies with a larger form factor to accommodate the input connector components (and additional components to handle the larger input power). This adds high cost, requiring design work for the power supply, thereby necessitating an increase in the form factor of the server, thereby necessitating design of a server rack to accommodate the changed form factor, and other cascading effects.

Embodiments of the present disclosure enable the dependable use of standard rated line cords and input interfaces with power supplies serving the high power needs of today's servers and other computing devices. Through dedicated primary side (i.e., input) monitoring, the embodiments can detect when the current being drawn by the power supply through its input interface exceeds 100% (or some other percentage) of the maximum rating of the input components, such as the input cable. When such an input overcurrent state is detected, the power supply can enter a fault state, and initiate a delay and a timer. In various embodiments, the power supply can disconnect the output circuitry upon entering the fault state, so that the system loads cannot continue to pull power through the power supply. After the delay expires, the power supply can attempt to reenable the output circuitry. Once there is an attempt to reenable, the system continues to monitor the current being drawn by the power supply through its input interface. If another input overcurrent condition is detected after being reenabled, the power supply can latch off and disable the timer. In various embodiments, latching off the power supply can include triggering a relay, switch or other latch device within the power supply. However, if no subsequent input overcurrent condition is detected before the timer expires, the power supply will remain operating and the timer ill be reset to its predetermined length.

FIG. 1A illustrates an example power supply 100 with input overcurrent protection in accordance with embodiments of the technology disclosed herein. As illustrated, the example power supply includes an input interface 102. In various embodiments, the input interface 102 can be an alternating current (AC) input or a direct current (DC) input. The input interface 102 may be configured to mate with an external input cable (not pictured) in some embodiments, while in others the input interface 102 may have an input cable permanently affixed.

The input interface 102 is generally connected to the conversion circuitry 104 of the power supply 100. In various embodiments, a bridge rectifier 106 (e.g., a full-wave rectifier) may be included in the conversion circuitry 104 where the input signal is AC. In implementations in which the power supply output is in DC, the bridge rectifier 106 may be included to transform the AC input signal received into a constant polarity output. For a DC-DC power supply, no bridge rectifier 106 is required. Whether a bridge rectifier 106 is used or not, the input signal may be filtered via a filter 108 and the output voltage adjusted using, for example, a voltage regulator 110. The filter 108 helps to smooth out the signal (whether direct DC or rectified DC) so that a near constant voltage is applied to the loads. The voltage regulator 110 prevents changes in the filtered DC voltage that might otherwise because by variations in the input voltage or the load. The conversion circuitry 104 is connected to an output interface 112.

The example power supply 110 can also include an output overcurrent protection module 114. The output overcurrent protection module 114 can be similar to conventional output overcurrent protection circuits and solutions used in the field to provide output overcurrent protection to power supplies. As discussed above, however, output overcurrent protection solutions in conventional power supplies are generally isolated from the input interface 102 of the power supply, and are focused instead on ensuring protection of the system connected to the output of power supply 100. As such, the existence of the output overcurrent protection module 114 does not provide protection of the input interface 102 or the input components (e.g., input cable) connected thereto.

In some embodiments, the input interface 102 in various embodiments can include one or more input fuses (not pictured). An input fuse is intended to provide protection where there is a catastrophic failure f the power supply. Generally, an input fuse is rated for greater than two times the maximum input current the power supply would draw if the system was operating at full load, but other fuse ratings can be provided. In high-power scenarios, that rating could easily exceed the input current rating for the input cable or the input interface 102. For example, it is possible that the system may draw current greater than the current rating of the input cable, but less than the rating of the input fuse. In such cases, the power supply would continue to draw the higher current, resulting in potential thermal damage to the input cable or other input components, or unreliable operation of the power supply. Moreover, an input fuse may be non-resettable such that once the fuse is blown, the power supply is inoperable unless and until that fuse is replaced. For users, this could cause excessive downtime at installations and the need to maintain a surplus of power supplies.

Various embodiments of power supply 100 include an input current protection module 116. Input overcurrent protection module 116 is configured to monitor the input current of the power supply from the input interface 102, prior to the conversion circuitry 116, Unlike input fuses, the input overcurrent protection module 116 provides the capability to provide protection to input cables and the input interface 102 in high-power scenarios where the loads, and the power supply, are capable of drawing above the input components current ratings at full load.

In various embodiments, the input overcurrent protection module 116 may be implemented in hardware circuitry of the power supply 100. In other embodiments, the input overcurrent protection module 116 can be implemented within an integrated circuit of the power supply 100. That is, the input overcurrent protection module 116 may be a digital circuit within one or more integrated circuit chips. In various embodiments, the integrated circuit may be a field-programmable gate array (FPGA), an application-specific integrated circuit (ASIC), complex programmable logic devices (CPLD), or other types of digital integrated circuits. In some embodiments, the integrated circuit may be a mixed-signal integrated circuit, including both analog and digital circuits. In other embodiments, the input overcurrent protection module 116 may be implemented in firmware stored in a non-volatile memory of the power supply 100, and executable by a processor of the power supply 100. In some embodiments, the processor of the power supply 100 may be an integrated circuit like those discussed above. In some embodiments, the input overcurrent protection module 116 and the output overcurrent protection module 114 may be implemented within the same integrated circuit.

The input overcurrent protection module 116 can be designed to monitor the input interface 102 to determine when the input current exceeds the rating of the various input components. For example, the input current protection module 116 may be designed to protect a standard, 10A/16A rms rated input cable from overcurrent events. Following this example, in various embodiments the input overcurrent protection module 116 may be configured to determine when the input current exceeds greater than 10A overcurrent for greater than a predetermined period of time. An overcurrent detection timer can be adjusted based on the amount of tolerance is acceptable. Continuing with the standard cable example, the overcurrent detection timer may be four seconds, such that when the input current exceeds 10A for greater than four seconds the input overcurrent protection module 116 would trigger that an overcurrent event has occurred. The input overcurrent protection module 116 can then send a signal to disable the power supply, or parts of the power supply. For example, the signal may shut down power supply 100, it may disable conversion circuitry 104, it may disable the output interface 112, or it may open a switch effectively disconnecting components such as, for example, input interlace 102 or output interface 112.

By disconnecting the output interface 112, the input overcurrent protection module can protect the input cable by cutting the overload current from being drawn. In various embodiments, the input overcurrent protection module 116 may trigger the power supply 100 to turn off at the detection of an input overcurrent event However, as the power supply is capable of supplying the necessary power and is only limited by the input components, the input overcurrent protection module 116 can protect the input components by merely disabling the output interface without shutting down the input interface 102 as well.

Figure 1B:
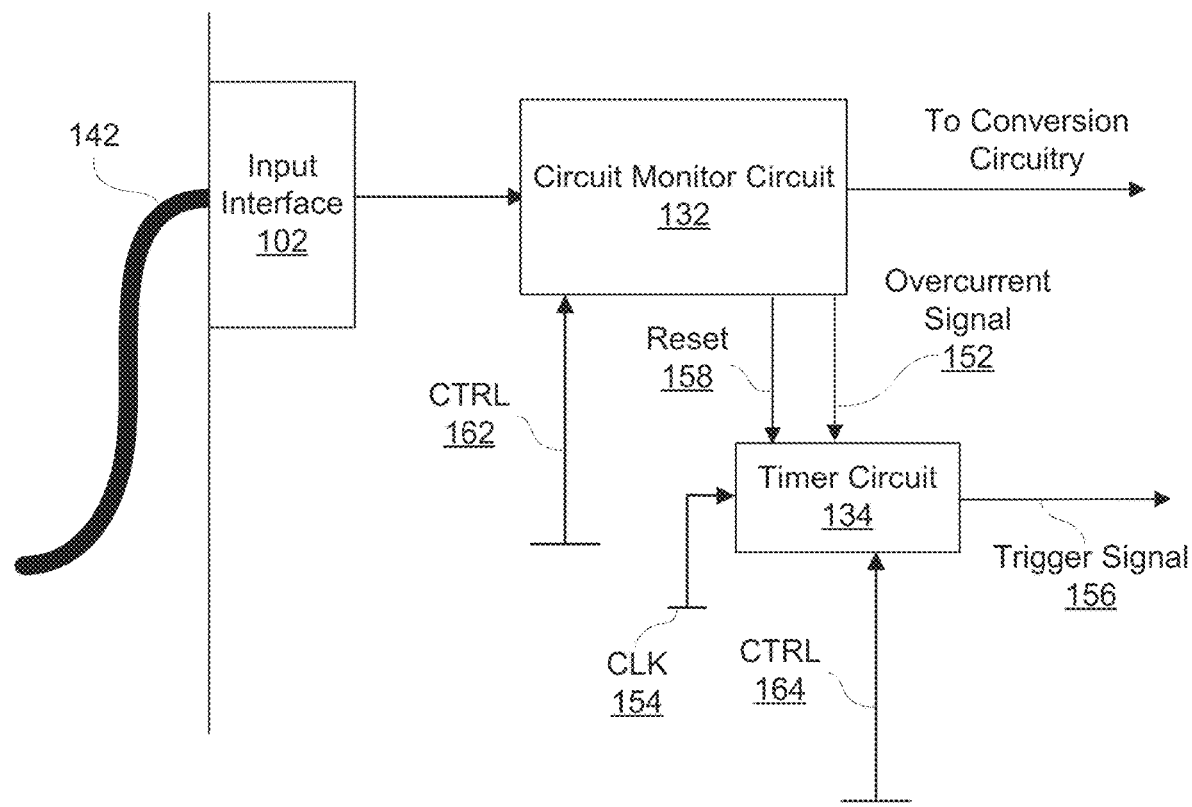
FIG. 1B illustrates an example input current protection circuit in accordance with embodiments of the technology disclosed herein.

FIG. 1B illustrates an example input overcurrent protection circuit in accordance with embodiments of the technology disclosed herein. This example current protection circuit includes a current monitor circuit 132 and a timer circuit 134. In operation, current monitor circuit 132 monitors the current at input interface 102. For example, circuitry connected between input interface 102 and conversion circuitry 104 can monitor the amount of current being drawn via the input components such as, for example, in input cable 142. When an overcurrent condition is detected (e.g., the current level is greater than a specified threshold) overcurrent signal 152 is generated by the current monitor circuit 132 and sent to timer circuit 134. For example, overcurrent signal 152 can present a HIGH (or LOW) signal level at the input of timer circuit 134. The rising (or falling) edge of overcurrent signal 152 initiates timer circuit 134 to begin timing the duration of the overcurrent condition. For example, timer circuit 134 can be implemented as a counter circuit or other like circuit to count clock pulses provided by a clock signal 154. Other time circuits can be used.

If the overcurrent condition persists for longer than a predetermined amount of time, timer circuit 134 sends a trigger signal 156 to the power supply to shut down the power supply or one or more components thereof. When current monitor circuit 132 detects that the current level has fallen below the set threshold, a reset signal 158 can be sent to timer circuit 134 to reset the timer and stop counting. If the reset signal 158 is received before timer circuit 134 has reached the predetermined amount of time, no trigger signal 156 is sent.

In some implementations, a secondary timer may be included such that the reset signal 158 is not sent immediately upon detecting the current has fallen below a threshold level. If the input current returns above the threshold level before the secondary timer reaches a specified value, then the reset signal 158 is not sent. In other words, the secondary timer (not shown) can be used to require the reset signal 158 to be present for predetermined period of time before resetting timer circuit 134. This can be included to ensure that short-duration dips below threshold that may occur in between long-duration overcurrent conditions don't reset the timer.

Thus, an input overcurrent event is determined to have occurred when a triggering condition is satisfied. In the example described above, the triggering condition is that the input current is above the threshold for a predetermined amount of time. However, this is merely one example of a triggering condition that could be used to determine whether an input overcurrent event has occurred. In some examples, other triggering conditions may be considered in addition to or in lieu of the above-described condition. For example, another triggering condition that could be used by the input overcurrent protection module 116 is whether the current rises above the threshold more than a specified number of times within a specified period. This condition would capture recurring but relatively brief rises above the threshold.

Similar circuitry as that illustrated in FIG. 1B could be used for testing the second example condition noted above, with the addition of a counter (not illustrated) to count the number of times the overcurrent signal 152 occurs. In this example, the timer circuit 134 could begin to run when a first overcurrent signal 152 is received and continue to run until a specified time has passed, whereupon the timer circuit 134 could reset the counter. If the counter passes a specified number, then it may send the trigger signal 156.

In various embodiments, control inputs 162, 164 can be provided to adjust the settings of current monitor circuit 132 and timer circuit 134. For example, control signal 162 can be used to adjust the current thresholds programmed into the current monitor circuit 132. Likewise, control signal 164 can be used, for example, to adjust the amount of time that must elapse before a trigger signal 156 is sent.

The example circuit illustrated in FIG. 1B can be implemented, for example, as an integrated circuit or as discrete components. In other embodiments, other circuits can be used. For example, an integrator circuit can be used to accumulate the amount of overcurrent condition experienced by input components. When a predetermined accumulation of overcurrent condition is detected by the integrator circuit, the integrator circuit can send a trigger signal (e.g., trigger signal 156) to shut down the power supply or components thereof. Use of an integrator circuit, or other like circuit, may allow the system to take into account the amounts by which the current is above threshold and the corresponding times for these overcurrent conditions. Thus, for the input current is above threshold by only a small amount, this condition may be permitted to occur for a longer period of time before the power supply is shut down, possibly giving the system time to recover. On the other hand, where the input current is above threshold by a large amount (posing more imminent risk to the input components), the power supply may be shut down sooner.

Figure 2:
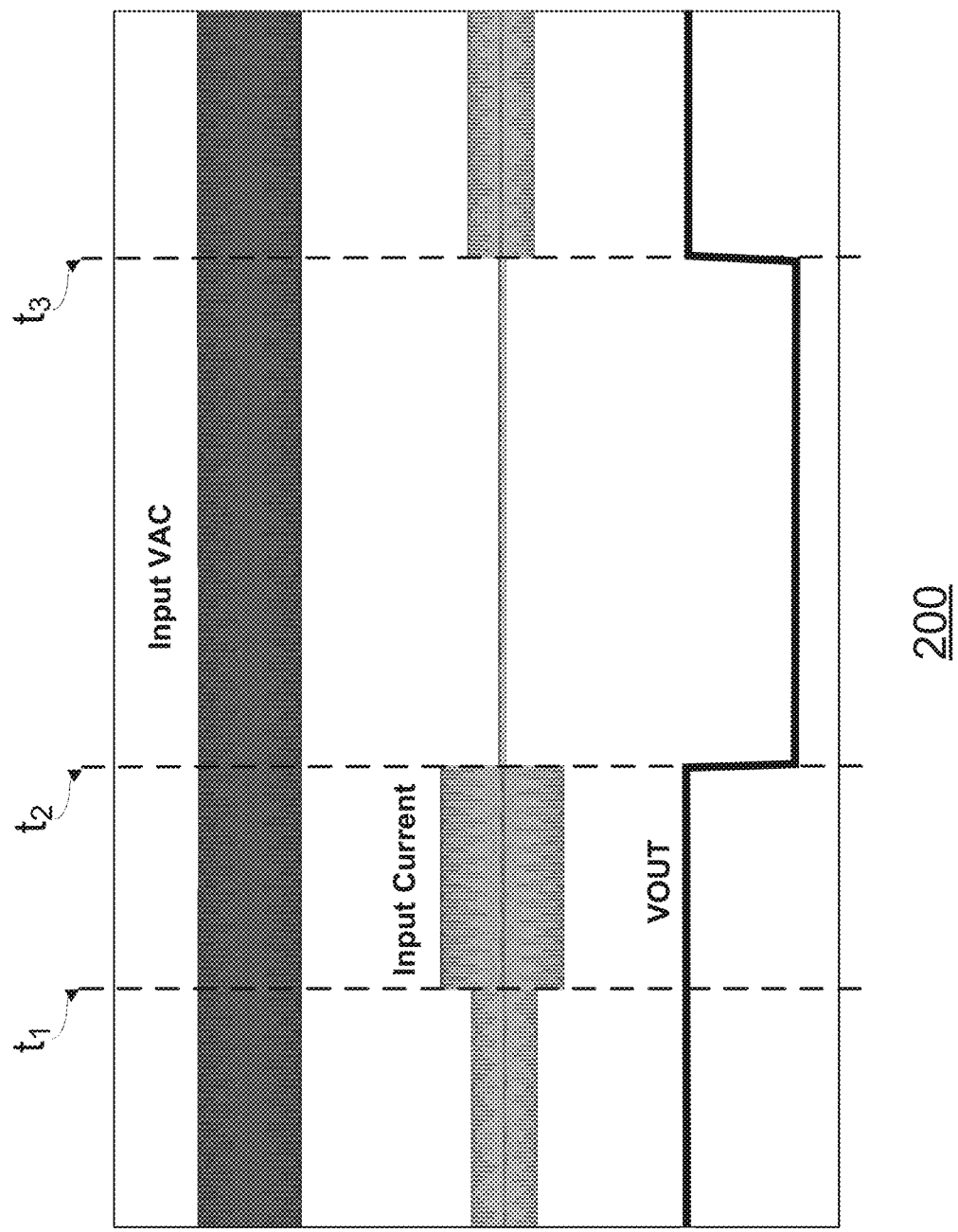
FIG. 2 is a signal readout illustrating an example operation of the input current protection module in accordance with embodiments of the technology disclosed herein.

FIG. 2 is a signal readout 200 illustrating the operation of the input current protection module 116 in accordance with embodiments of the present disclosure. This signal readout 200 use the example of a standard 10A-rated input cable connected to a power supply. As illustrated, at time $t_1$, the input current protection module detects that the input current has exceeded 10A (i.e., the maximum rated current), and triggers the overcurrent event detection timer (in this example, four seconds). When the overcurrent event detection timer ends at time $t_2$, the input current protection module detects that the input current is still exceeding 10A. Therefore, the input current protection module can trigger the power supply to enter a "FAULT" state, sending a signal to the output interface to disable power output, as illustrated by the drop in VOUT in the signal readout 200 going from HIGH to LOW. In this example, the power supply remains on, as indicated by the input VAC illustrated at the top remaining constant throughout operation. In other embodiments, the input current protection module may turn off the power supply, resulting in the input VAC going to zero, as well.

As illustrated in the example of FIG. 2, at the detection of the overcurrent event at time $t_2$, the input current protection module can also trigger at time $t_2$ a reenable delay. The reenable delay is a set time that the input current protection module waits following a detected overcurrent event before attempting to reenable the output circuitry. As illustrated, the reenable delay in this example is set at eight seconds. Once the reenable delay expires at time $t_3$, the input current protection module sends a reenable signal to the output circuitry, and the loads can again draw power from the power supply.

As can be seen in the example of FIG. 2, following expiration of the reenable delay, the input current remained below the 10A maximum. However, in some cases the input current could immediately be over 10A once the output circuitry is reenabled, or the overcurrent condition may take some time to flare up again. Such cases could indicate a persistent issue, and continually disabling and re-enabling the output circuitry may be detrimental to power supply reliability. Therefore, in some embodiments, the input current protection module may also trigger a reoccurrence timer at time $t_2$. The reoccurrence timer may be a set time during which, if the input current is still over 10A before the VOUT transitions back to HIGH or another input overcurrent event is detected, the input current protection module may disable the reoccurrence timer and signal the power supply to latch off. In this way, the input overcurrent protection module may protect the input components from a persistent issue within the system that causes the input current to exceed maximum ratings. The power supply can only be reset by disconnecting the input cable. In various embodiments, the reoccurrence timer may be set for a length of time sufficient to indicate no persistent issue. In various embodiments, the input overcurrent protection module may be configured to send a signal to shut down the power supply and trigger a latch device. The latch device may be connected to both the input overcurrent protection module and the output overcurrent protection module.

If the current does not exceed 10A prior to the VOUT transitioning back to HIGH (in the case of an internal short circuit or issue with the power supply), or no further input overcurrent events are detected within the reoccurrence timer (in the case of short circuits or issues with the system), the input current protection module can reset the reoccurrence timer. As the expiration of the timer indicates that a persistent issue does not exist, the input current protection module can go back through the cycle upon detection of a later input overcurrent event.

Although the example used to describe the operation of the input overcurrent protection module was with respect to the input cable or cord, other input components may also be protected by the input overcurrent protection module. For example, the input overcurrent protection module may be configured such that the maximum rated current is set based on the rating of the interface component (e.g., an AC inlet). In various embodiments, the input overcurrent protection module may be configured to use as the maximum rated current the lowest maximum rating of any input component. In various embodiments, two input overcurrent protection modules may be included in a power supply, each designed to protect a different input component.

Further, although the example illustrated in FIG. 2 identifies specific times for the overcurrent detection timer and the reenable delay, this should not be interpreted to limit the scope of the technology to only those express values. As stated above, the different delays and timers may be set according to the needs and tolerances of the system. A person of ordinary skill would not read this disclosure as limiting the time range of any specific delay or timer.

Figure 3:
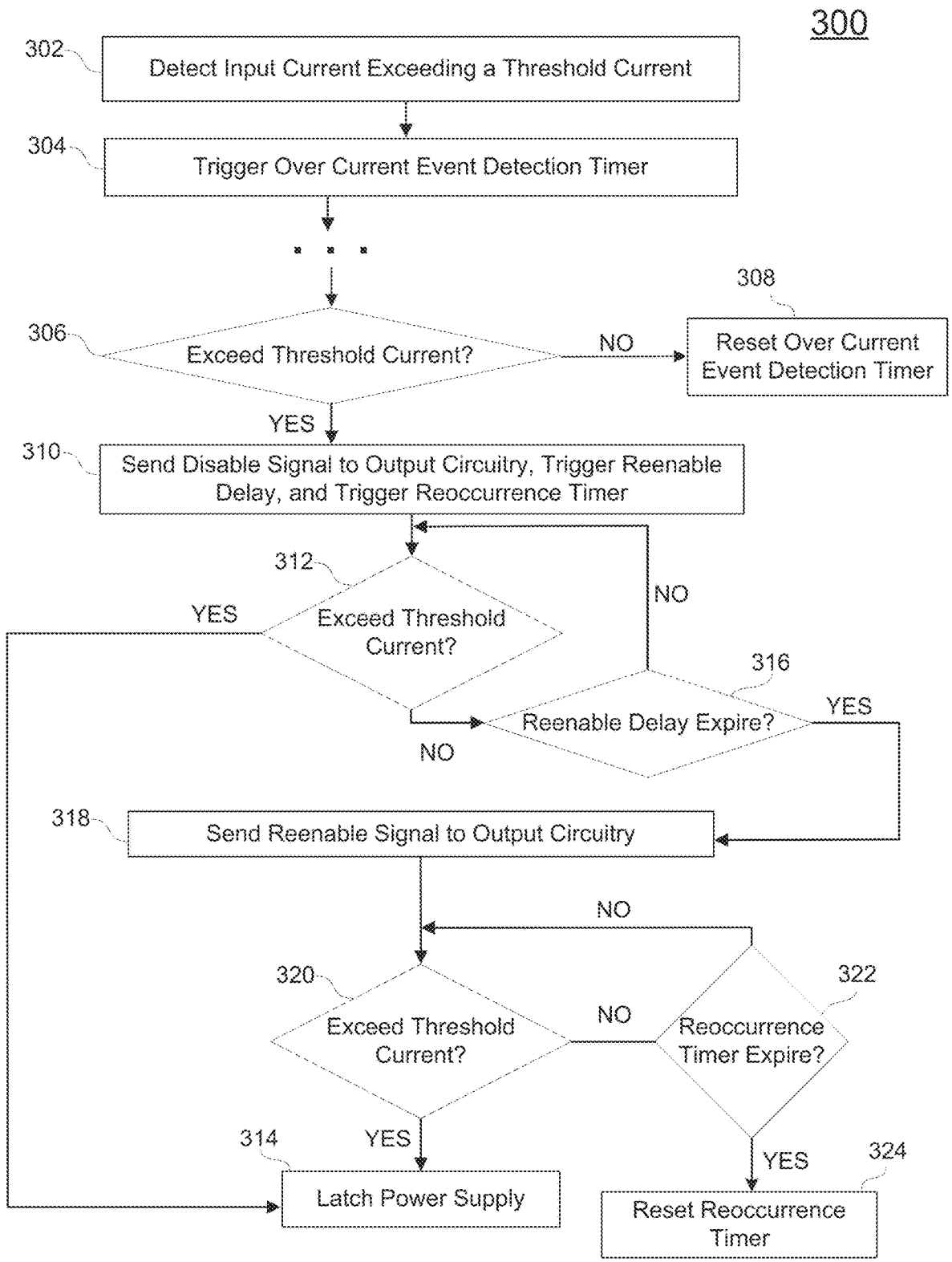
FIG. 3 illustrates an example method in accordance with embodiments of the technology disclosed herein.

FIG. 3 illustrates an example method 300 in accordance with embodiments of the technology disclosed herein. Example method 300 may be executed by an input overcurrent protection module, like the one discussed with respect to FIGS. 1A, 1B, and 2. At operation 302, an input current exceeding a threshold current is detected. In various embodiments, the input component may be an input cord, an AC inlet, a DC inlet, a connector or another component used to provide a power input into the power supply. The threshold hold current is a maximum current for which one or more input components are rated. For example, if a standard input cord is used connect the power supply to a power source, the threshold current can be set as the maximum current for which the input cord is rated, as explained with respect to the sample scenario in FIG. 2.

At operation 304, an overcurrent event detection tinier is triggered. The overcurrent event detection timer may be similar to the overcurrent event detection timer described with respect to FIGS. 1B and 2. In various embodiments, the overcurrent event detection timer represents a period for waiting to see if the higher input current was a mere spike or other transient occurrence, or if it lasts long enough to indicate a potential issue for the input components.

At the expiration of the overcurrent event detection timer, it is determined whether the input current is still over the threshold current at decision 306. In various embodiments, the determination is made by an input overcurrent protection module, like the one discussed with respect to FIGS. 1A, 1B and 2, If the input current is no longer above the threshold current, an overcurrent event is deemed not to have been detected and the overcurrent event detection timer is reset at operation 308. If, however, the input current is still over the threshold current, several actions may be taken at operation 310. These may include one or more of a disable signal to the output circuitry; a reenable delay is triggered; and a reoccurrence timer is triggered. The actions taken at operation 310 can be performed by an input overcurrent protection module like the one discussed with respect to FIGS. 1A, 1B and 2. In various embodiments, these actions can place the power supply into a "FAULT" state.

The circuitry continues to monitor the input current even after the power supply is placed into a FAULT state. At decision 312, circuitry determines whether the input current is still over the threshold current. If the input current still exceeds the threshold current at 312, the power supply is latched off at operation 314. If the input current is determined to exceed the threshold current at 312, this may indicate an issue with the power supply itself as there is no load during this period because the output circuitry is still disabled.

If the input current does not exceed the threshold current at 312, the circuitry determines whether the reenable delay has expired at decision 316. If the delay has not expired, the output circuitry remains disabled and the input current will continued to be checked in the FAULT state (e.g., with the output disabled) to determine whether the issue is within the power supply itself. If the reenable delay has expired, the method 300 exits the loop and a reenable signal is sent to the output circuitry at operation 318.

Figure 4:
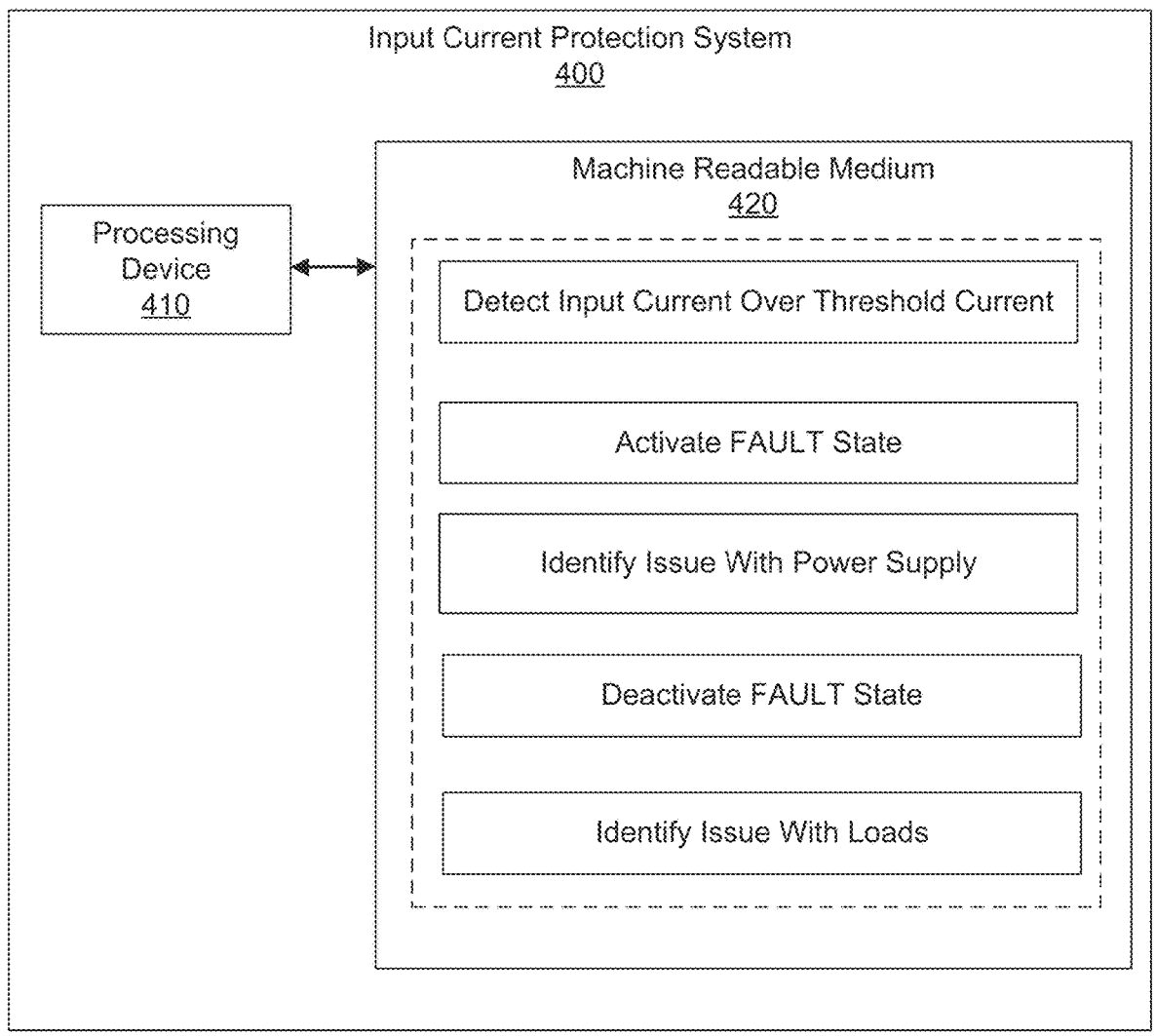
FIG. 4 illustrates an example input current protection system in accordance with embodiments of the technology disclosed herein.

After re-enabling the output circuitry, a new loop begins. A decision is made at 320 whether the input current still exceeds the threshold current. If it does, the power supply is latched off at operation 314 such that the power supply cannot be reset without disconnecting the input cable. In various embodiments, the reoccurrence timer can also be disabled when the input current still exceeds the threshold current. If the threshold current is not exceeded, at decision 322 it is determined whether the reoccurrence timer has expired. If the timer has not expired, the loop continues, with the input current protection module continuing to check the input current against the threshold current. If the reoccurrence timer has expired, and the input current has not exceeded the threshold current during that time, the reoccurrence timer is reset at operation 324. In this way, the method 300 can be triggered again the next time that the input current exceeds the threshold current, FIG. 4 illustrates an example input current protection system 400 in accordance with embodiments of the technology disclosed herein. In various embodiments, the input current protection system 400 may be similar to the input overcurrent protection module 114 discussed with respect to FIGS. 1-3. As illustrated, example input current protection system 400 includes a processing device 410. In various embodiments, processing device 410 may be an integrated circuit may be a field-programmable gate array (FPGA), an application-specific integrated circuit (ASIC), complex programmable logic devices (CPLD), or other types of digital integrated circuits. In some embodiments, the processing device 410 may be a microcontroller or other processor-type device.

Processing device 410 is configured to execute instructions stored on a machine readable medium 420. In various embodiments, the machine readable medium 420 may be firmware instructions stored in a non-volatile memory of the input current protection system 400. In some embodiments, machine readable medium 420 may be one or more types of computer storage mediums. Non-limiting examples include: flash memory; solid state storage (SSD) devices; storage area network (SAN); removable memory (e.g., memory stick, CD, SD cards, etc.); or internal computer RAM or ROM; among other types of computer storage mediums.

The instructions stored on the machine readable medium 420 may include various sub-instructions for performing the function embodied by the identified functions. For example, "Detect Input Overcurrent Event" may comprise sub-instructions for detecting an input current over a threshold current, triggering an input overcurrent event detection timer, and resetting an input overcurrent event detection timer, similar to the operations 302-308 of FIG. 3 and the operation of input current protection module 116 discussed with respect to FIGS. 1-2. The instruction "Activate FAULT State" may comprise sub-instructions for disabling power supply output circuitry, triggering a reenable delay, and triggering a reoccurrence timer, similar to operation 310 of FIG. 3, and the operation of input overcurrent protection module 116 discussed with respect to FIGS. 1-2. The instruction "Identify Issue With Power Supply" may comprise sub-instructions to check the input current while the power supply is in the FAULT state, latching the power supply if the threshold is exceeded, and whether the reenable timer has expired, similar to the decisions 312, 314, and 316 of FIG. 3, and the operation of input current protection module 116 discussed with respect to FIGS. 1A, 1B, and 2. The instruction "Deactivate FAULT State" may comprise sub-instructions to send a reenable signal to the output circuit like operation 318 of FIG. 3, and the operation of input current protection module 116 discussed with respect to FIGS. 1A, 1B and 2. The instruction "Identify Issue With Loads" may comprise sub-instructions to check the input current after re-enabling the output circuitry, latching the power supply if the threshold is exceeded, whether the reoccurrence timer has expired, disabling the reoccurrence timer, and resetting the reoccurrence timer similar to operations 314 and 320-324 of FIG. 3, and the operation of input overcurrent protection module 116 discussed with respect to FIGS. 1A, 1B and 2. Machine readable medium 620 may include additional instructions to perform other functions in various embodiments.

In general, the word "component," "engine," "system," "database," "data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations.

The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto.

In common usage, the term "or" can have an inclusive sense or exclusive sense. As used herein, the term "or" should always be construed in the inclusive sense unless the exclusive sense is specifically indicated or logically necessary. The exclusive sense of "or" is specifically indicated when, for example, the term "or" is paired with the term "either", as in "either A or B." As another example, the exclusive sense may also be specifically indicated by appending "exclusive" or "but not both" after the list of items, as in "A or B, exclusive" and "A or B but not both." Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A device, comprising:
    an input interface;
    a conversion circuitry connected to the input interface and configured to convert an input power received from the input interface into an output power;

an output interface connected to the conversion circuitry and configured to receive the output power from the conversion circuitry and supply the output power to a load; and an input current protection module connected to the input interface and configured to detect an input current drawn from the input interface;

wherein the input current protection module is configured to
- detect an input overcurrent event comprising the input current satisfying one or more overcurrent criteria,
- in response to detecting the input overcurrent event, enter a first fault state, and
- while in the first fault state, disable the supply of the output power from the output interface to the load while allowing the conversion circuitry to continue to receive the input power and generate the output power.

2. The device of claim 1, wherein the input current protection module is an integrated circuit.

3. The device of claim 1, wherein the input current protection module is a processing device configured to execute one or more instructions maintained in a machine-readable storage medium.

4. The device of claim 3, wherein the machine-readable storage medium is a non-volatile memory.

5. The device of claim 1, wherein the overcurrent criteria comprise the input current through the input interface exceeding a threshold current.

6. The device of claim 5, the threshold current comprising a maximum current rating for an input component.

7. The device of claim 6, the input component comprising one of an input cable, an AC inlet, a DC inlet, or other component of the input interface.

8. The device of claim 5, wherein the overcurrent criteria further comprise the input current through the input interface exceeding the threshold current for a length of an overcurrent event detection timer.

9. The device of claim 1, wherein the input current protection module is configured to, upon entering the first fault state, trigger a reenable delay and, while in the first fault state, continue to monitor the input current for input overcurrent events.

10. The device of claim 9, wherein, if the input current protection module detects a second input overcurrent event while in the first fault state, the input current protection module is configured to exit the first fault state and send a signal to shut down and latch the device.

11. The device of claim 10, wherein, if a second input overcurrent event is not detected while in the first fault state, the input current protection module is configured to, upon expiration of the reenable delay, exit the first fault state and send a reenable signal to the output interface to reenable the supply of the output power from the output interface to the load.

12. The device of claim 1, wherein the input current protection module is configured to, upon entering the first fault state, trigger a reoccurrence timer.

13. The device of claim 12, wherein, if a second input overcurrent event is detected before the reoccurrence timer expires, the input current protection module is configured to send a signal to shut down and latch the device.

14. The device of claim 12, wherein, if the input current protection module does not detect a second input overcurrent event before the reoccurrence timer expires, the input current protection module is configured to reset the reoccurrence timer.

15. A method, comprising:
- detect, by an input current protection module, an input current through an input interface of a power supply exceeding a threshold current;
- trigger, by the input current protection module, an overcurrent event detection timer;
- if an input overcurrent event is detected, send, by the input current protection module, a disable signal to an output circuitry, trigger a reenable delay, and trigger a reoccurrence timer;
- if the input current does not exceed the threshold current before the reenable delay expires, send, by the input current protection module, a reenable signal to the output circuitry; and
- if a second input overcurrent event occurs before the reoccurrence timer expires, latch, by the input current protection module, the power supply.

16. The method of claim 15, wherein an input overcurrent event occurs when the input current exceeds the threshold current for a set amount of time.

17. The method of claim 15, wherein latching the power supply comprises shutting down the power supply and triggering a latch device.

18. The device of claim 1, wherein the input current protection module is configured to:
- in response to a first defined period of time from entering the first fault state elapsing, exit the first fault state and enter a second fault state in which the supply of the output power from the output interface to the load is reenabled;
- in response to a second input overcurrent event being detected while in the first fault state or the second fault state, disable the supply of the input power from the input interface to the conversion circuitry.

19. The device of claim 18, wherein the input current protection module is configured to:
- in response to a second defined period of time from entering the first fault state elapsing without the second input overcurrent event being detected, exit the second fault state and enter a normal operation state; and
- in response to the second input overcurrent event being detected while in the normal operation state, reenter the first fault state.

* * * * *